H. S. PALMER.
Fence-Post.
No. 212,868. Patented Mar. 4, 1879.
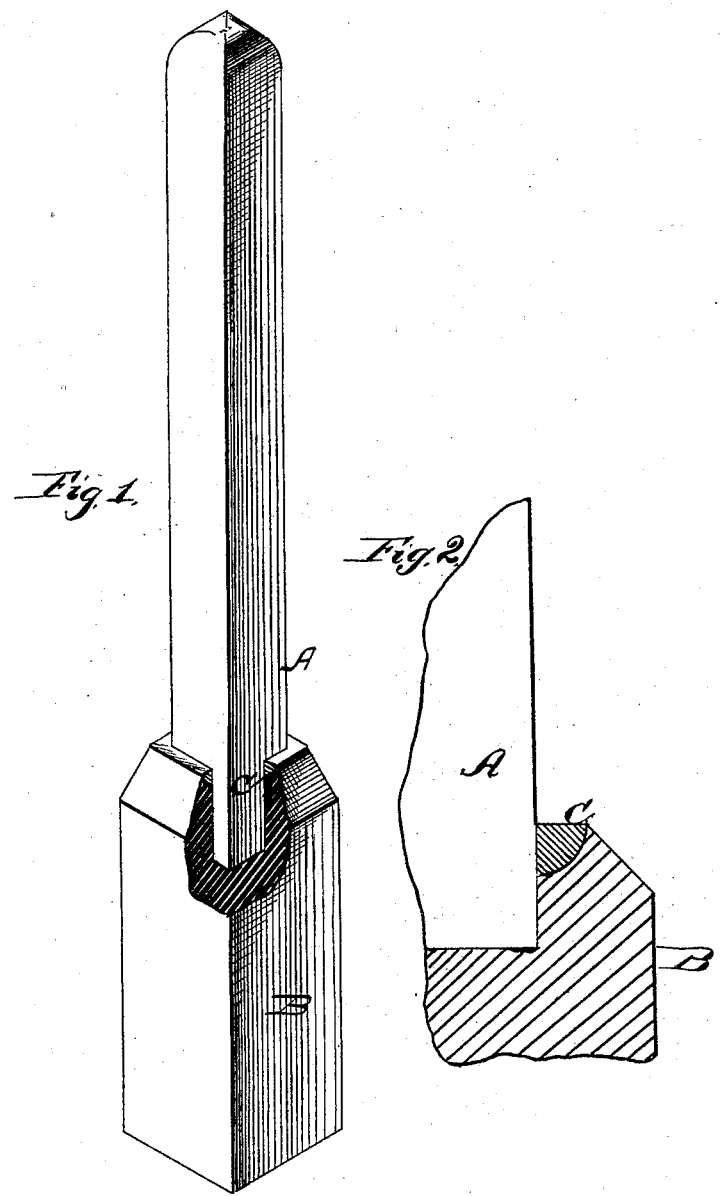
Witnesses:
W. C. McArthur
John C. Rogers
Inventor:
H. S. Palmer
per
T. H. Alexander & Elliott
Attorneys.

UNITED STATES PATENT OFFICE.

HARMON S. PALMER, OF OWOSSO, MICHIGAN.

IMPROVEMENT IN FENCE-POSTS.

Specification forming part of Letters Patent No. 212,868, dated March 4, 1879; application filed August 9, 1878.

*To all whom it may concern:*

Be it known that I, HARMON S. PALMER, of Owosso, in the county of Shiawassee and State of Michigan, have invented certain new and useful Improvements in Fence-Posts; and I do hereby declare that the following is a full, clear, and exact description thereof, reference being had to the accompanying drawings, and to the letters of reference marked thereon, which form part of this specification, in which the view is a perspective of my post, partly in section.

The nature of my invention consists in the construction of a cheap and durable fence-post, as will be more fully set forth hereinafter.

In order to enable others skilled in the art to which my invention appertains to make and use the same, I will now proceed to describe the same.

A represents a wood post set upright on a base, B, formed of artificial stone. This base B I make of a composition of cement and common sand, in any suitable proportions, but preferably about four-fifths sand and one-fifth cement. I mix them together with water till the right consistency is gained, and form a kind of mortar, which is placed in a mold around the bottom of the post A, and packed tightly in any suitable manner. Around the post A, at the top of the base B, I form a groove, which I fill with coal-tar, C, mixed with any substance to harden it, and compose a sort of gum which will expand and contract with the expansion and contraction of the wood, thus keeping a water-tight joint around the post, and preventing any moisture from penetrating to the bottom to rot it.

By this construction I have a cheap, simple, and durable fence-post, in which wood is greatly economized, and the bottom prevented from rotting.

The base, being constructed from common sand and cement, which is easily obtained, may be made by any person without any machinery, being simply formed in a mold, and the mold then taken apart and the post set out to dry.

I am aware that fence-posts have been made with a base of earthenware, burned similar to brick, and do not claim such, broadly, as my invention.

I am aware that posts have been planted or set in plastic material, for the purpose of better retaining them in an upright position when the material hardens. This idea, it will be observed, is essentially different from mine, as I mold the material on the posts before setting them, thus furnishing them with a permanent base, and they may thus be sold in the market already prepared for setting. I therefore disclaim the idea of planting posts in a plastic material.

What I do claim as new, and desire to secure by Letters Patent, is—

1. The wooden post A, having a base, B, molded thereon, composed of common sand and cement, or any equivalent material for preserving the bottom of the post, substantially as set forth.

2. The combination of a wooden post with a plastic base molded permanently thereon, and provided with a groove, C, all as and for the purposes set forth.

In testimony that I claim the foregoing as my own I affix my signature in presence of two witnesses.

HARMON S. PALMER.

Witnesses:
G. R. LYON,
CHAS. E. HERSHEY.